July 4, 1933.   J. P. KELLER   1,916,840
ROLLER DRIER FOR CYLINDRICAL BODIES AND METHOD
OF HANDLING SUCH BODIES THEREIN
Filed April 16, 1931   2 Sheets-Sheet 1
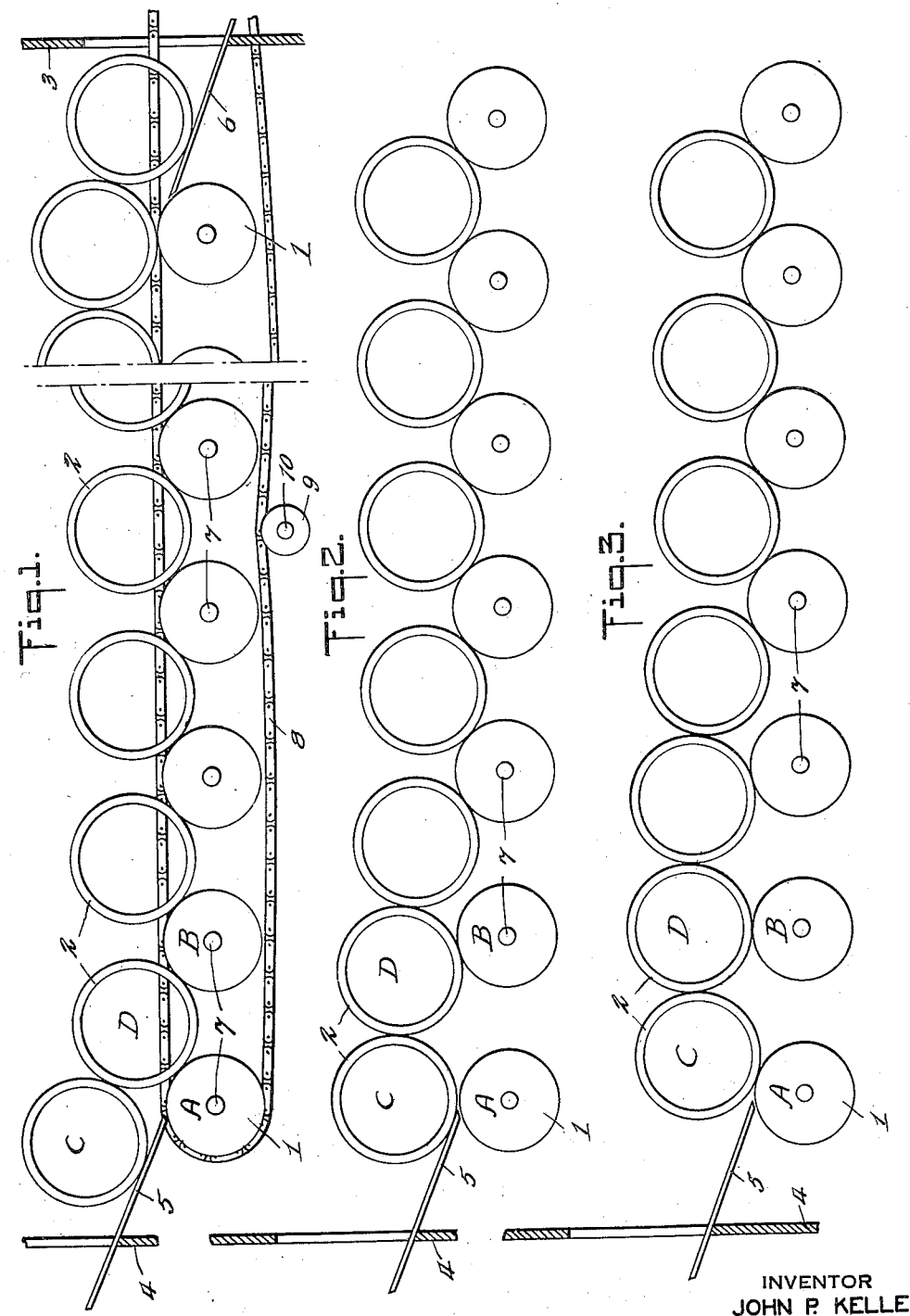
INVENTOR
JOHN P. KELLER
BY
ATTORNEYS

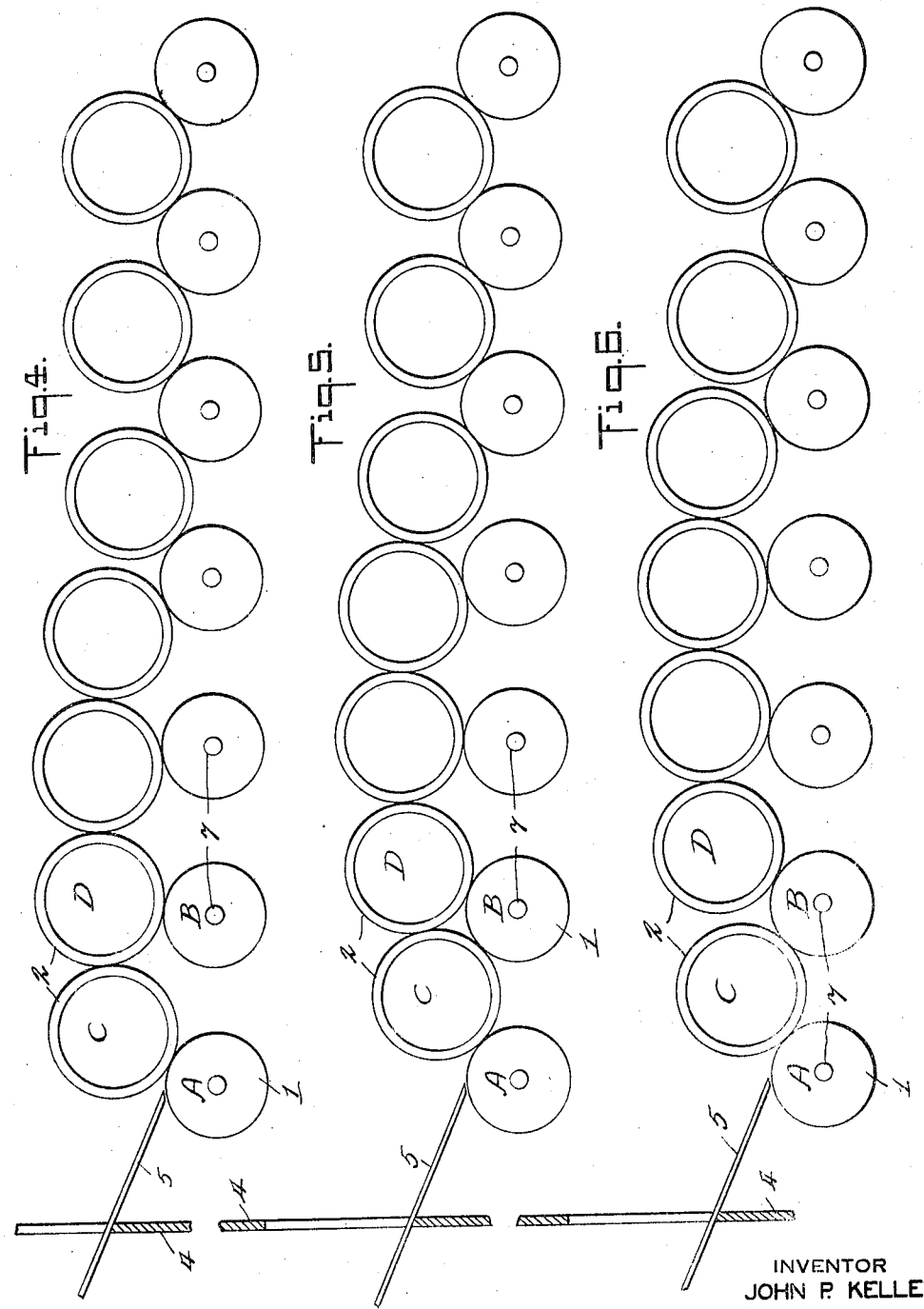

Patented July 4, 1933

1,916,840

UNITED STATES PATENT OFFICE

JOHN P. KELLER, OF ORANGEBURG, NEW YORK, ASSIGNOR TO THE FIBRE CONDUIT COMPANY, OF ORANGEBURG, NEW YORK, A CORPORATION OF NEW YORK

ROLLER DRIER FOR CYLINDRICAL BODIES AND METHOD OF HANDLING SUCH BODIES THEREIN

Application filed April 16, 1931. Serial No. 530,709.

This invention relates more especially to that type of drier in which cylindrical tubular bodies or ducts, particularly these made of fibre, after formation and while still moist, are conveyed through a drying oven with their axes horizontal and arranged broadside on with respect to the direction of feed and are, in the intermissions of feeding movements, rotated continuously on their own axes for the purpose of facilitating the drying operation and at the same time preventing deformation of the tubular bodies before they have become sufficiently dried to be rigid.

The main purpose of my invention is to provide an improved method of conveying the tubular bodies or ducts through the drying oven and apparatus therefor of improved construction. My invention contemplates a form of conveyor in which the conveyor rolls are on stationary axes, instead of being drawn through the drier while rotating the tubular bodies being dried, and my invention further contemplates the use of the tubular bodies themselves, in cooperation with the rotating conveyor rolls, to cause their own movement through the drier—a condition which, on account of the soft nature of the tubular bodies at that stage, presents a problem requiring especial arrangements for its solution. More specifically stated, my improved method of conveying ducts through a drying oven contemplates the continuous rotation of the ducts on their own axes and intermittently a progressive creeping of said ducts in the direction of feed by means of their tractive contact with the conveyor rolls and their interaction on each other. For this purpose, my improved conveyor construction contemplates conveyor rolls rotatable on parallel stationary axes arranged transversely to the direction of movement within the drying oven, said rolls being suitably spaced to adapt each successive roll in conjunction with the adjacent roll to peripherally engage one of the drying tubular bodies or ducts. With this arrangement of the conveyor rolls on stationary axes, means are provided for feeding the tubular bodies or ducts one at a time into peripheral engagement with the tubular body which has previously been positioned between and above the feed rolls of the rearmost pair of feed rolls. By means of a continuous rotation of the feed rolls and the consequent rotation of the tubular bodies in an opposite direction in respect thereto, progressive creeping movements of the tubular bodies are set up from the rear end of the series at recurring intervals, the time consumed in passing the tubular bodies through the drying oven being regulated by and dependent upon the rate at which the separate units are fed in at the receiving end of the conveyor.

A preferred embodiment of my invention is shown on the drawings, in which

Figures 1 to 6 illustrate diagrammatically in side elevation six successive phases of the movement in one of the several stages which may be arranged in the drying oven.

Referring more particularly to the drawings, a single stage or tier of parallel conveyor rolls 1 is arranged transversely with respect to the path of feed of a series of tubular bodies 2, through a drying oven which is represented constructively by lines 3 and 4 which indicate the end walls of said drying oven. The train of conveyor rollers is viewed in the several figures from the side of the drier with the receiving end at the left, and the use of the terms "left" and "right" will be convenient to designate the position of the parts at the receiving and delivery ends respectively. Inclined downwardly and forwardly from the wall 4 at the receiving end of the drying oven, is a feed board 5 which may terminate slightly to the left of a vertical plane through the axis of the first conveyor roll of the train and tangential to the roll surface on a line slightly to the right of said vertical plane. Leading from the final conveyor roll in the series, is an inclined ramp or guide 6 over which the tubular bodies or ducts may be discharged from the oven. Each of the feed rolls 1 is carried by a shaft 7 which is journalled upon a stationary axis and all of said feed rolls may be rotated in unison by means for example of an endless power-driven chain 8 with its upper run only operating over sprocket wheels (not shown)

which are keyed to the far ends of the shafts 7. The return run of said endless chain may pass over and be supported by a series of guide rollers 9 journalled on fixed pins 10.

According to the embodiment of my invention shown on the drawings, all of the conveyor or feed rolls 1 are rotated in a clockwise direction by the upper run of the sprocket chain 8 operating through the sprocket wheels keyed to the feed-roll shafts 7. It will be understood from the foregoing description that a tubular body admitted to the drying oven moves down the inclined feed board 5 and lodges between and on the paired feed-rolls nearest to the left-hand end of the oven. Said tubular body thereupon begins to rotate upon its own axis by reason of its rotatable engagement with said feed-rolls. The next tubular body (shown on the feed board 5 in Figures 1 and 2) admitted to the oven is momentarily blocked in its movement into the position occupied by the end tubular body already on the rolls, as shown in Figure 1, which illustrates at the left the rear or starting end of the conveyor, and at the right the delivery end thereof, the two ends of the train being interrupted by dot and dash lines to indicate omission of the intermediate part of the train of rolls. As soon as this condition is established, the continued tangential thrust of the second feed-roll from the left upon the cylindrical body already on the rolls, combined with the reaction upon it of the tubular body being fed in, operates to lift the first tubular body around the periphery of the second feed-roll until it drops into running engagement with the second and third feed-rolls from the left end of the conveyor. For simplicity of reference, I mark the two left-hand rolls in the several figures with the letters A and B, and the two left-hand cylindrical bodies C and D, the body D being in place on the rolls A, B, and the body C being upon the feed board 5, which it has descended till it contacts with cylindrical body D. It will be observed that the thrust of the clockwise rotation of roll B on body D continues to be exerted upward. But when the body C contacts with D, the balancing downward thrust of roll A on body D is relieved, the body C at the same time tending to oppose the rotation of D about its axis, so that the axis of rotation of body D is transferred to the line of contact between the two bodies and the tractive effect of roll B lifts the body D to the position shown in Figure 2. When the body C moves onto the roll A as shown in Figure 3, the two rolls tend to rotate both bodies counter-clockwise, and the roll A acting through the body C coacts with the traction of roll B in lifting the body D from the position shown in Figure 2 to that shown in Figure 3. Thus the rolls A and B first exert direct but opposing tractive effect on the two sides of body D during the period of free axial rotation of the latter, and then by the interposition of body C, the tractive effect of roll A, exerted through the idling body C, is reversed and both rolls A and B, one indirectly and the other directly, exert a tangential lifting effect on body D, both assisting in the raising of the same. The bodies C and D are now both held from axial rotation by the frictional engagement of their contact surfaces where each tends to oppose the rotation of the other, while the forward thrust of body C on D and the tractive effect of both A and B carries the two bodies forward successively to the positions shown in Figures 4 and 5. This operation is repeated whenever a new tubular body is fed-in until the conveyor is completely filled. The successive positions of the rolls as the wave of tubular bodies in contact moves along the conveyor, is illustrated in Figures 2 to 5, Figure 6 illustrating the condition when the bodies in contact have parted from the body resting on the initial set of feed-rolls and started to move along the conveyor. Figures 2 to 6 show only the left-hand end of the train of rolls. According to the showing made in Figures 2 to 4, the last fed-in tubular body has not yet become seated on the first pair of feed-rolls but is held back by a number of tubular bodies in close order in front of it. The last tubular body on the right is eventually displaced from the right end of the conveyor and is discharged from the oven, as shown at the right of Figure 1. The cycle of operations as thus recited is repeated at each introduction of a new tubular body on the left and for each one admitted on the left another one is discharged from the oven on the right. It will be seen, therefore, that the conveyor is always completely charged with tubular bodies during the progress of the drying operation while the output on the right is regulated by and dependent upon the feed-in of tubular bodies at the left. Until disturbed by applying the force imparting a movement of translation to them, the cylindrical bodies are maintained in free axial rotation due to their tractive engagement with the feed rolls. A cylindrical body being handled in the machine, is thus first allowed to dwell in the bight between two rolls, out of contact with bodies on adjacent rolls, and in a state of free axial rotation, and is then given a movement of translation by the continued tractive effect of the roll lying in the direction of feed while in non-rotative contact with an adjacent body or bodies, its alternate periods of contact with two and then with one roll giving alternating periods of rotation under treatment and then of progression toward the delivery end of the train of rolls.

It appears that the roll centers should be at greater distances apart than the diameter of the tubes being treated, so that the tubes when rotating shall not be in contact, but that they should be close enough to cause the tubes to contact before a forward moving tube has reached the vertical plane of the axis of the feed roll over which it is rising, so that the tube ahead of it will be displaced before the rear tube passes over the summit of that roll; and that the roll circumferences should be separated at less distances than the diameter of the tubes, so that the tubes shall not pass down between the rolls. It appears also to be an advantage that the bight between the rolls be such as to afford a secure seat for the tubes when rotating during the drying operation in the periods between the intermittent feeding operations.

The speed of rotation of the conveyor rolls may be varied. The time of feeding of tubular bodies from the initial feeding position to a position in contact with the first set of conveyor rolls varies with the speed of rotation of the conveyor rolls. The time for passage of a tubular body through the drier, depends on the interval between the feeding of new bodies to the drier.

I have found that for handling 4⅝ inch (outside diameter) tubular bodies, good results are obtained with 3¾ inch feed-rolls set on 6 inch centers. With these dimensions forward feed of the bodies takes place, without rotation of the bodies temporarily in contact, and so without injury to the surface of the bodies. With other sizes of tubular bodies, some changes in these dimensions, readily calculated or found by experiment, may be made to obtain most perfect results.

I claim:—

1. A method of advancing a cylindrical body across a train of rolls to successive positions in which it is caused to rotate freely about its own axis by its tractive engagement with successive pairs of said rolls, said method consisting in placing said cylindrical body on one pair of said rolls, applying a tangential force to said body to retard its rotation about its own axis thereby combining the tractive engagement of the supporting roll in advance of the body with the counter-tangential effect of said force to raise said cylindrical body from its position on said pair of rolls and over the roll in advance thereof.

2. A method of advancing a cylindrical body across a train of rolls to successive positions in which it is caused to rotate freely about its own axis by its tractive engagement with successive pairs of said rolls, said method consisting in placing said cylindrical body on one pair of said rolls, and in placing a second cylindrical body in peripheral contact with one side of the first-mentioned cylindrical body for applying a tangential force opposed to its free axial rotation thereby combining the tractive effect of the roll in advance with the counter tangential effects of the second body for raising the first-mentioned cylindrical body from its position on said one pair of rolls and transferring it to a position on a pair of rolls in advance thereof.

3. A method of handling cylindrical bodies, which method consists in placing said bodies upon rotated supporting rolls and freely rotating them about their own axes by their tractive engagement with successive pairs of said rolls, in applying a retarding force to one of said cylindrical bodies in opposition to the rotation caused by the tractive engagement of the roll in advance whereby the first-mentioned cylindrical body is raised from its position on one pair of rolls and into peripheral contact with the cylindrical body on the next pair of supporting rolls in advance for progressively forming a cumulative series of said cylindrical bodies advancing as a group over said supporting rolls.

4. A method of handling cylindrical bodies, which method consists in placing said bodies upon rotated supporting rolls and freely rotating them about their own axes by their tractive engagement with successive pairs of said rolls, in progressively applying a retarding tangential force to said cylindrical bodies thereby combining the tractive engagement of the respective rolls in advance with the retarding tangential forces thereon to raise the first-mentioned cylindrical body from its position on one pair of rolls and over the respective supporting rolls in advance.

5. A method of handling cylindrical bodies constructed of relatively soft material, which method consists in placing said bodies upon rotated supporting rolls and freely rotating them about their own axes by their tractive engagement with successive pairs of said rolls, in applying to said cylindrical bodies forces of insufficient intensity to injure them and thereby combining therewith the tangential effects of the supporting rolls respectively in advance of said bodies to raise them from between the respective pairs of rolls by which they are supported whereby a series of said cylindrical bodies is brought into contacting engagement and advanced as a group over said supporting rolls.

6. A method of advancing a soft cylindrical body across a train of rolls to successive positions in which it is caused to rotate freely about its own axis by its tractive engagement with successive pairs of said rolls, said method consisting in placing said soft cylindrical body on one pair of said rolls, and in placing a second soft cylindrical body in peripheral contact with one side of the first-mentioned cylindrical body while partially supporting the weight of the second soft cylindrical body independently of the first-mentioned body whereby a tangential force opposed to the free axial rotation of the first-mentioned body is combined with the tractive engagement of the roll in advance thereof for raising the first-mentioned soft cylindrical body from its position on one pair of rolls and transferring it to a position on a pair of rolls in advance thereof without injury to said body.

7. A method of causing progression of a series of cylindrical bodies across a train of rolls with different pairs of which they are successively in tractive engagement causing free axial rotation, said method consisting in bringing into peripheral contact with the rearmost one of a series of cylindrical bodies already on the rolls, another cylindrical body to oppose in a tangential direction the free axial rotation of the rearmost body while continuing the tractive engagement of the rearmost body with the roll in advance, thereby combining the tangential effect of the roll in advance with the counter tangential effect of the contacting body for raising the said rearmost body and moving it into peripheral engagement with the next body of the series whereby a plurality of bodies in advance thereof are progressively raised and brought into closely contacting relation for causing them to shift as a group across the train of rolls, successively leaving behind in tractive engagement with rolls of the train, cylindrical bodies from the rear of the group and adding to it cylindrical bodies at the front of the group until the foremost cylindrical body on the train is discharged therefrom.

8. A drier for cylindrical bodies, comprising a drying chamber provided with an inlet and a discharge outlet, a series of equidistant rolls rotatable about fixed axes, the common diameter and relative positions of said rolls being definitely proportioned to the diameter of the cylindrical bodies to be dried, and means for partially supporting an additional cylindrical body in peripheral contact with a freely rotating body on one pair of said rolls, the roll immediately in advance of the freely rotating body being adapted by the relative arrangement and spacing of said rolls in respect to the size of said cylindrical bodies combined with the retarding effect of said additional cylindrical body to raise said freely rotating body and advance it over the roll in advance thereof.

9. In a drier for cylindrical bodies, the combination with a series of equidistant rolls rotatable about fixed axes, the common diameter and relative positions of said rolls being definitely proportioned to the diameter of the cylindrical bodies, and an inclined feed board for delivering an additional cylindrical body into peripheral contact with a freely rotating body on one pair of said rolls, the relative arrangement and spacing of said rolls in respect to the size of said cylindrical bodies adapting the combined tangential effects of the roll immediately in advance of said freely rotating body and said additional cylindrical body to raise said freely rotating body over the roll in advance thereof.

10. A drier for cylindrical bodies, comprising a drying chamber provided with inlet and discharge ends, a series of equidistant rolls rotatable about fixed axes and interposed in a straight series between said inlet and discharge ends, the common diameter and relative positions of said rolls being definitely related to the diameter of the cylindrical bodies, and means for placing an additional cylindrical body in peripheral contact with a freely rotating body on one pair of said rolls whereby the retarding tangential effect of said additional cylindrical body may be combined with the tangential effect of the roll immediately in advance of the freely rotating body for raising said freely rotating body from between the rolls which support it, the relative arrangement and spacing of said rolls in respect to the size of said cylindrical bodies being adapted to form a plurality of said freely rotating bodies into a group of contacting bodies and to move them as a group over said rolls between said inlet and discharge ends of the drier.

JOHN P. KELLER.

DISCLAIMER 1,916,840.—*John P. Keller*, Orangeburg, N.Y. ROLLER DRIER FOR CYLINDRICAL BODIES AND METHOD OF HANDLING SUCH BODIES THEREIN. Patent dated July 4, 1933. Disclaimer filed June 6, 1934, by the patentee, and the assignee, *The Fibre Conduit Company*.

Hereby enter this disclaimer to that part of the claim in said specification which is in the following words, to wit:

"1. A method of advancing a cylindrical body across a train of rolls to successive positions in which it is caused to rotate freely about its own axis by its tractive engagement with successive pairs of said rolls, said method consisting in placing said cylindrical body on one pair of said rolls, applying a tangential force to said body to retard its rotation about its own axis thereby combining the tractive engagement of the supporting roll in advance of the body with the counter-tangential effect of said force to raise said cylindrical body from its position on said pair of rolls and over the roll in advance thereof."

"8. A drier for cylindrical bodies, comprising a drying chamber provided with an inlet and a discharge outlet, a series of equidistant rolls rotatable about fixed axes, the common diameter and relative positions of said rolls being definitely proportioned to the diameter of the cylindrical bodies to be dried, and means for partially supporting an additional cylindrical body in peripheral contact with a freely rotating body on one pair of said rolls, the roll immediately in advance of the freely rotating body being adapted by the relative arrangement and spacing of said rolls in respect to the size of said cylindrical bodies combined with the retarding effect of said additional cylindrical body to raise said freely rotating body and advance it over the roll in advance thereof."

[*Official Gazette June 26, 1934.*]